United States Patent [19]

Mancusi

[11] Patent Number: 5,670,268
[45] Date of Patent: Sep. 23, 1997

[54] DRY CELL BATTERY STORAGE CASE

[76] Inventor: Diane S. Mancusi, 226 Corona Ave., Staten Island, N.Y. 10306

[21] Appl. No.: 610,461

[22] Filed: Mar. 4, 1996

[51] Int. Cl.$^6$ .................................................. H01M 2/10
[52] U.S. Cl. ........................ 429/9; 429/99; 220/507; 220/528
[58] Field of Search .................. 429/9, 1, 99; 220/507, 220/528, 367.1

[56] References Cited

U.S. PATENT DOCUMENTS

| | | | |
|---|---|---|---|
| 2,743,035 | 4/1956 | Fogarty | 220/367.1 X |
| 3,494,798 | 2/1970 | Teeter et al. | 136/134 |
| 3,532,221 | 10/1970 | Kaluhiokalani et al. | 220/507 X |
| 4,852,725 | 8/1989 | Folsom | 220/507 X |
| 5,308,717 | 5/1994 | Gordin | 429/99 |
| 5,311,989 | 5/1994 | Ward et al. | 206/333 |
| 5,324,598 | 6/1994 | White et al. | 429/99 |

*Primary Examiner*—John S. Maples
*Attorney, Agent, or Firm*—Richard L. Miller, P.E.

[57] ABSTRACT

A dry cell battery storage case that includes a hollow, open top, parallelepiped-shaped lower portion; a hollow, open bottom, parallelepiped-shaped upper lid portion, pivoting apparatus, and a parallelepiped-shaped flat holder insert. The hollow, open bottom, parallelepiped-shaped upper lid portion is pivotally mounted to the hollow, open top, parallelepiped-shaped lower portion and movable through a closed position and an open position relative to the hollow, open top, parallelepiped-shaped lower portion. The pivoting apparatus pivotally mounts the hollow, open bottom, parallelepiped-shaped upper lid portion to the hollow, open top, parallelepiped-shaped lower portion. And, the parallelepiped-shaped flat holder insert is disposed in the hollow, open top, parallelepiped-shaped lower portion and has a plurality of throughbores for removably receiving a plurality of different sized and shaped batteries, so that the plurality of different sized and shaped batteries can be stored and organized in the dry cell battery storage case.

12 Claims, 2 Drawing Sheets

5,670,268

DRY CELL BATTERY STORAGE CASE

BACKGROUND OF THE INVENTION

The present invention relates to a dry cell battery storage case. More particularly, the present invention relates to a dry cell battery storage case that includes a hollow open top box having a carrying strap and snap locks and containing an internal chamber, a lockable lid hinged to the hollow open top box, and an insert removably mounted in the internal chamber of the hollow open top box and having a plurality of different sized and shaped apertures for removably receiving different sized and shaped dry cell batteries and miscellaneous parts.

Standard batteries, such as a "AA", "AAA", "C", "D", and 9V type, have different lengths, diameters, and positive terminal nubbin diameters.

Battery manufactures sell these batteries in packs of different sizes to accommodated the different sized and shaped batteries. Often the number of batteries supplied in the pack does not match the requirement of the device concerned. This often leaves spare batteries which are simply left without any suitable storage location. The more organized household may store the batteries in a single location but in many households the spare batteries in the pack are simply lost and therefore the cost involved in purchasing those spare batteries is wasted.

Numerous, innovations for battery storage devices have been provided in the prior art that will be described. Even though these innovations may be suitable for the specific individual purposes to which they address, however, they differ from the present invention in that they do not teach a dry cell battery storage case that includes a hollow open top box having a carrying strap and snap locks and containing an internal chamber, a lockable lid hinged to the hollow open top box, and an insert removably mounted in the internal chamber of the hollow open top box and having, a plurality of different sized and shaped apertures for removably receiving different sized and shaped dry cell batteries and miscellaneous parts.

FOR EXAMPLE, U.S. Pat. No. 3,494,798 to Teeter et al. teaches a wet-cell storage battery case formed of a transparent, synthetic resin. Cell Outlets are channeled to a central point closed by a single cap. The channels are mounted in notched inserts across the partition tops between the cells.

ANOTHER EXAMPLE, U.S. Pat. No. 5,308,717 to Gordin teaches a battery clamping jig that includes a bottom plate with recesses conforming to the batteries, a top plate with similar recesses, and a restraining member for retaining the top plate to the bottom plate.

STILL ANOTHER EXAMPLE, U.S. Pat. No. 5,311,989 to Ward et al. teaches a blister card battery pack that includes a backing member, and a plastic blister which has a peripheral lip that is attached to the backing member. The plastic blister has means disposed thereon for preventing the rotation of a battery contained therein.

FINALLY, YET ANOTHER EXAMPLE, U.S. Pat. No. 5,324,598 to White et al. teaches a battery storage module that includes a generally rectangular body having a front face defining vertical receptacle for receiving the batteries. Across the top are receptacles for receiving the batteries and at the bottom are openings for dispensing the batteries.

It is apparent that numerous innovations for battery storage devices have been provided in the prior art that are adapted to be used. Furthermore, even though these innovations may be suitable for the specific individual purposes to which they address, they would not be suitable for the purposes of the present invention as heretofore described.

SUMMARY OF THE INVENTION

ACCORDINGLY, AN OBJECT of the present invention is to provide a dry cell battery storage case that avoids the disadvantages of the prior art.

ANOTHER OBJECT of the present invention is to provide a dry cell battery storage case that is simple and inexpensive to manufacture.

STILL ANOTHER OBJECT of the present invention is to provide a dry cell battery storage case that is simple to use.

YET ANOTHER OBJECT of the present invention is to provide a dry cell battery storage case that holds, stores, and organizes the most popular used batteries.

STILL YET ANOTHER OBJECT of the present invention is to provide a dry cell battery storage case that is easily accessible, especially in an emergency.

YET STILL ANOTHER OBJECT of the present invention is to provide a dry cell battery storage case that ends frustrating searches for batteries scattered all over the house or office.

STILL YET ANOTHER OBJECT of the present invention is to provide a dry cell battery storage case that held many batteries to accommodate today's larger battery packs.

BRIEFLY STATED, YET STILL ANOTHER OBJECT of the present invention is to provide a dry cell battery storage case that includes a hollow, open top, parallelepiped-shaped lower portion, a hollow, open bottom, parallelepiped-shaped upper lid portion, pivoting apparatus, and a parallelepiped-shaped flat holder insert.

STILL YET ANOTHER OBJECT of the present invention is to provide a dry cell battery storage case wherein the hollow, open bottom, parallelepiped-shaped upper lid portion is pivotally mounted to the hollow, open top, parallelepiped-shaped lower portion and movable through a closed position and an open position relative to the hollow, open top, parallelepiped-shaped lower portion.

YET STILL ANOTHER OBJECT of the present Invention is to provide a dry cell battery storage case wherein the pivoting apparatus pivotally mounts the hollow, open bottom, parallelepiped-shaped upper lid portion to the hollow, open top, parallelepiped-shaped lower portion.

STILL YET ANOTHER OBJECT of the present invention is to provide a dry cell battery storage case wherein the parallelepiped-shaped flat holder insert is disposed in the hollow, open top, parallelepiped-shaped lower portion and has a plurality of throughbores for removably receiving a plurality of different sized and shaped batteries, so that the plurality of different sized and shaped batteries can be stored and organized in the dry cell battery storage case.

YET STILL ANOTHER OBJECT of the present invention is to provide a dry cell battery storage case wherein said hollow, open top, parallelepiped-shaped lower portion has an open top, a generally rectangular-shaped flat bottom with a long front side, a long back side, and a pair of short sides, a pair of generally rectangular-shaped flat short side walls that extend vertically upwardly from said pair of short sides of said generally rectangular-shaped flat bottom of said hollow, open top, parallelepiped-shaped lower portion, a generally rectangular-shaped flat long back wall that extends vertically upwardly from said long back side of said generally rectangular-shaped flat bottom of said hollow, open top, parallelepiped-shaped lower portion, and a generally rectangular-shaped flat long front wall that extends vertically upwardly from said long front side of said lower portion generally rectangular-shaped flat bottom of said hollow, open top, parallelepiped-shaped lower portion and has an outer surface and a pair of short sides.

STILL YET ANOTHER OBJECT of the present invention is to provide a dry cell battery storage case wherein the pair of generally rectangular-shaped flat short side walls of the hollow, open top, parallelepiped-shaped lower portion, the generally rectangular-shaped flat long back wall of the hollow, open top, parallelepiped-shaped lower portion, and the generally rectangular-shaped flat long front wall of the hollow, open top, parallelepiped-shaped lower portion form a continuous perimeter that together with the generally rectangular-shaped flat bottom of the hollow, open top, parallelepiped-shaped lower portion define an internal space.

YET STILL ANOTHER OBJECT of the present invention is to provide a dry cell battery storage case wherein the hollow, open top, parallelepiped-shaped lower portion is plastic.

STILL YET ANOTHER OBJECT of the present invention is to provide a dry cell battery storage case wherein the dry cell battery storage case is 10" long, 7½" wide, and 2½" high, so that an ample supply of the plurality of different sized and shaped batteries can be stored and organized therein.

YET STILL ANOTHER OBJECT of the present invention is to provide a dry cell battery storage case wherein the hollow, open bottom, parallelepiped-shaped upper lid has a generally rectangular-shaped flat top with an inner surface, a long front side, a long back side, and a pair of short sides, a pair of generally rectangular-shaped flat short side walls that extend vertically downwardly from the pair of short sides of the generally rectangular-shaped flat top of the hollow, open bottom, parallelepiped-shaped upper lid portion, a generally rectangular-shaped flat long back wall that extends vertically downwardly from the long back side of the generally rectangular-shaped flat top of the hollow, open bottom, parallelepiped-shaped upper lid portion, a generally rectangular-shaped flat long front wall that extends vertically downwardly from the long front side of the generally rectangular-shaped flat top of the hollow, open bottom, parallelepiped-shaped upper lid portion and has an outer surface and a pair of short sides.

STILL YET ANOTHER OBJECT of the present invention is to provide a dry cell battery storage case wherein the pair of generally rectangular-Shaped flat short side walls of the hollow, open bottom, parallelepiped-shaped upper lid portion, the generally rectangular-shaped flat long back wall of the hollow; open bottom, parallelepiped-shaped upper lid portion, and the generally rectangular-shaped flat long front wall of the hollow, open bottom, parallelepiped-shaped upper lid portion form a continuous perimeter that together with the generally rectangular-shaped flat top of the hollow, open bottom, parallelepiped-shaped upper lid portion define a parallelepiped-shaped internal space.

YET STILL ANOTHER OBJECT of the present invention is to provide a dry cell battery storage case wherein the hollow, open bottom, parallelepiped-shaped upper lid portion is plastic.

STILL YET ANOTHER OBJECT of the present invention is to provide a dry cell battery storage case wherein the hollow, open bottom, parallelepiped-shaped upper lid portion is 10" long, 7½" wide, and 1¼" high, so that an ample supply of the plurality of different sized and shaped batteries can be stored and organized therein.

YET STILL ANOTHER OBJECT of the present invention is to provide a dry cell battery storage case wherein the parallelepiped-shaped flat holder insert of the hollow, open bottom, parallelepiped-shaped upper lid portion is sized to fill the internal space of the of the hollow, open top, parallelepiped-shaped lower portion to a height slightly below the open top of the hollow, open top, parallelepiped-shaped lower portion.

STILL YET ANOTHER OBJECT of the present invention is to provide a dry cell battery storage case wherein the plurality of throughbores of the parallelepiped-shaped flat holder insert of the hollow, open top, parallelepiped-shaped lower portion has at least one first sized and shaped throughbore, at least one second sized and shaped throughbore, at least one sized and shaped third throughbore, a least one fourth sized and shaped throughbore, at least one fifth sized and shaped throughbores, and a compartment sized and shaped throughbore.

YET STILL ANOTHER OBJECT of the present invention is to provide a dry cell battery storage case wherein each of the at least one first sized and shaped throughbore of the parallelepiped-shaped flat holder insert of the hollow, open top, parallelepiped-shaped lower portion is circular with a diameter of 1¼", so that a "D" battery can be stored therein and removed therefrom.

STILL YET ANOTHER OBJECT of the present invention is to provide a dry cell battery storage case wherein each of the at least one second sized and shaped throughbore of the parallelepiped-shaped flat holder insert of the hollow, open top, parallelepiped-shaped lower portion is circular with a diameter of 9/16", so that a "AA" battery can be stored therein and removed therefrom.

YET STILL ANOTHER OBJECT of the present invention is to provide a dry sell battery storage case wherein each of the at least one third sized throughbore of the parellelepiped-shaped flat holder insert of the hallow, open top, parallelepiped-shaped lower portion is circular with a diameter of 1", so that a "C" battery can be stored therein and removed therefrom.

STILL YET ANOTHER OBJECT of the present invention is to provide a dry cell battery storage case wherein each of the at least one fourth sized and shaped throughbore of the parallelepiped-shaped flat holder insert of the hollow, open top, parallelepiped-shaped lower portion is rectangular with a width of ⅝" and a length of 1", so that a "9V" battery can be stored therein and removed therefrom.

YET STILL ANOTHER OBJECT of the present invention is to provide a dry cell battery storage case wherein each of the at least one fifth sized and shaped throughbore of the parallelepiped-shaped flat holder insert of the hollow, open top, parallelepiped-shaped lower portion is circular with a diameter of 7/16" so that a "AAA" battery can be stored therein and removed therefrom.

STILL YET ANOTHER OBJECT of the present invention is to provide a dry cell battery storage case wherein the compartment sized and shaped throughbore of the parallelepiped-shaped flat holder insert of the hollow, open top, parallelepiped-shaped lower portion is generally rectangular with a width of 2¾" and a length of 3", so that miscellaneous parts can be stored therein and removed therefrom.

YET STILL ANOTHER OBJECT of the present invention is to provide a dry cell battery storage case that further includes a parallelepiped-shaped flat insert disposed of the inner surface of the generally rectangular-shaped flat top of the hollow, open bottom, parallelepiped-shaped upper lid portion in a position directly above the compartment sized and shaped throughbore of the parallelepiped-shaped flat holder insert of the hollow, open top, parallelepiped-shaped lower portion and has a size sufficient to slightly enter and close the compartment sized and shaped throughbore of the parallelepiped-shaped flat holder insert of the hollow, open top, parallelepiped-shaped lower portion when the hollow, open bottom, parallelepiped-shaped upper lid portion assumes the closed position, so that miscellaneous parts are maintained in the compartment sized and shaped throughbore of the parallelepiped-shaped flat holder insert of the hollow, open top, parallelepiped-shaped lower portion.

STILL YET ANOTHER OBJECT of the present invention is to provide a dry cell battery storage case that further includes a pair of snap lock catch parts.

YET STILL ANOTHER OBJECT of the present invention is to provide a dry cell battery storage case wherein each of the pair of snap lock catch parts are disposed on the outer surface of the generally rectangular-shaped flat long front wall of the hollows open top, parallelepiped-shaped lower portion in proximity to each of the pair of short sides of the generally rectangular-shaped flat long front wall of the hollow, open top, parallelepiped-shaped lower portion.

STILL YET ANOTHER OBJECT of the present invention is to provide a dry cell battery storage case that further includes a pair of snap lock latch parts.

YET STILL ANOTHER OBJECT of the present invention is to provide a dry cell battery storage case wherein each of the pair of snap lock latch parts are disposed on the outer surface of the generally rectangular-shaped flat long front wall of the hollow, open bottom, parallelepiped-shaped upper lid portion in proximity to each of the pair of short sides of the generally rectangular-shaped flat long front wall of the hollow, open bottom, parallelepiped-shaped upper lid portion.

STILL YET ANOTHER OBJECT of the present invention is to provide a dry cell battery storage case wherein the pair of snap lock latch parts of the hollow, open bottom, parallelepiped-shaped upper lid portion locking engage the pair of snap lock catch parts of the hollow, open top, parallelepiped-shaped lower portion, so that the hollow, open bottom, parallelepiped-shaped upper lid portion is maintained in the closed position.

YET STILL ANOTHER OBJECT of the present invention is to provide a dry cell battery storage case that further includes a carrying handle disposed on the outer surface of the generally rectangular-shaped flat long front wall of the hollow, open top, parallelepiped-shaped lower portion intermediate the pair of snap lock catch parts of the hollow, open top, parallelepiped-shaped lower portion, so that the dry cell battery storage case can be conveniently transported.

STILL YET ANOTHER OBJECT of the present invention is to provide a dry cell battery storage case wherein the pivoting apparatus includes apparatus selected from the group consisting of a piano hinge and spaced-apart hinges, so that the hollow, open bottom, parallelepiped-shaped upper lid portion can assume the closed position and the open position relative to the hollow, open top, parallelepiped-shaped lower portion.

YET STILL ANOTHER OBJECT of the present invention is to provide a dry cell battery storage case wherein the pivoting apparatus is disposed on the generally rectangular-shaped flat long back wall of the hollow, open top, parallelepiped-shaped lower portion and on the generally rectangular-shaped flat long back wall of the hollow, open bottom, parallelepiped-shaped upper lid portion.

FINALLY, STILL YET ANOTHER OBJECT of the present invention is to provide a dry cell battery storage case wherein each of the pair of generally rectangular-shaped flat short side walls of the hollow, open bottom, parallelepiped-shaped upper lid portion has a laterally-oriented vent disposed therethrough, so that when the hollow, open bottom, parallelepiped-shaped upper lid portion is in the closed position any gases developed from the plurality of different sized and shaped batteries stored therein can be properly evacuated therefrom while maintaining proper ventilation for longevity.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows.

Figure 1:
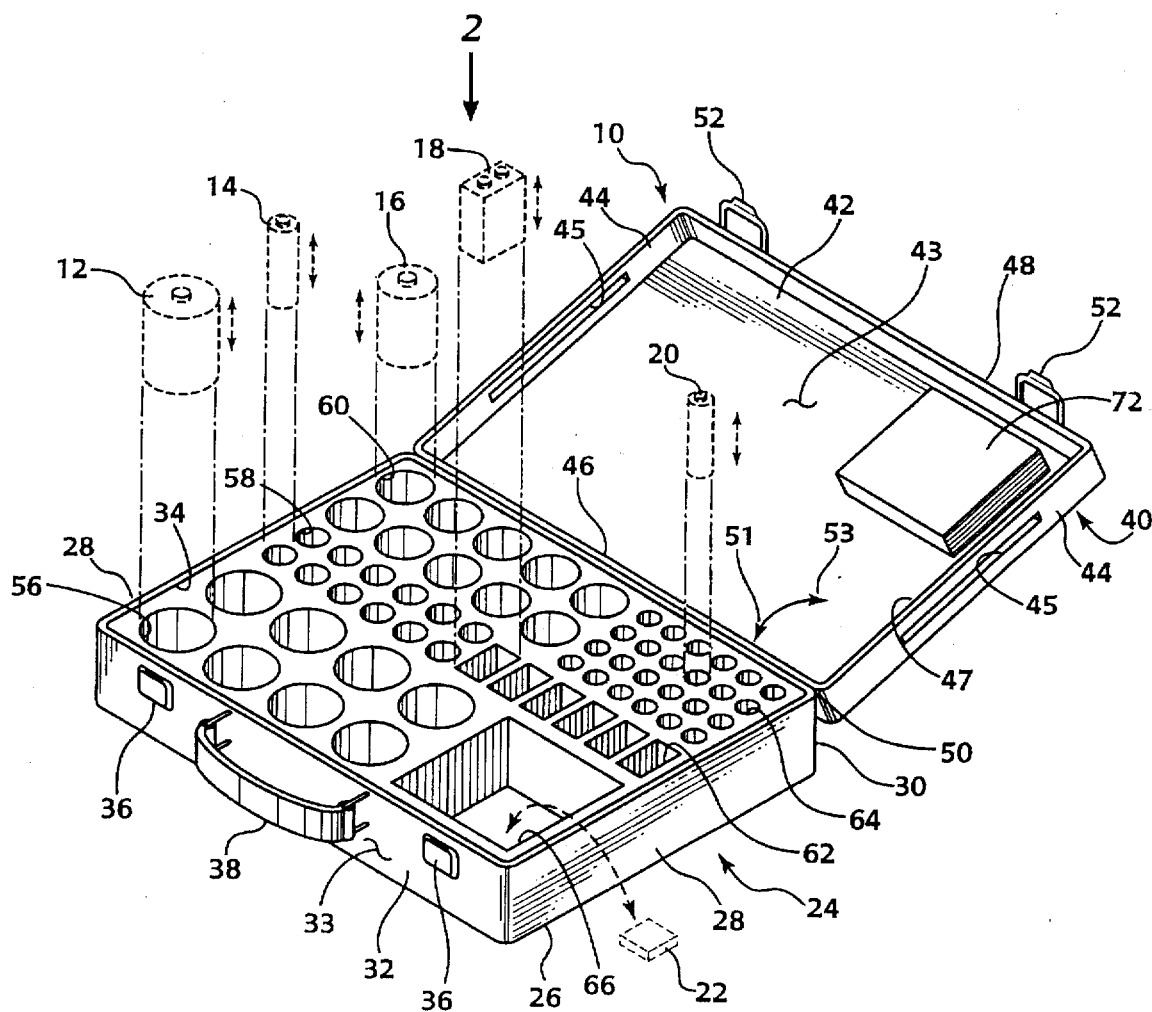
FIG. 1 is a diagrammatic perspective view of the present invention with the lid in the open position and illustrating in phantom batteries being placed into and removed from the case.

LIST OF REFERENCE NUMERALS UTILIZED IN THE DRAWING 10 dry cell battery storage case of the present invention
12 "D" battery
14 "AA" battery
16 "C" battery
18 "9V" battery
20 "AAA" battery
22 miscellaneous parts
24 hollow, open top, parallelepiped-shaped lower portion
26 lower portion generally rectangular-shaped flat bottom
28 pair of lower portion generally rectangular-shaped flat short side walls
30 lower portion generally rectangular-shaped flat long back wall
32 lower portion generally rectangular-shaped flat long front wall
33 lower portion front wall outer surface
34 lower portion parallelepiped-shaped internal space
36 pair of lower portion snap lock catch parts
38 carrying handle
40 hollow, open bottom, parallelepiped-shaped upper lid portion
42 upper lid portion generally rectangular-shaped flat top
43 upper lid portion top inner surface
45 upper lid portion short side laterally-oriented vent
46 upper lid portion generally rectangular-shaped flat long back wall
47 upper lid portion parallelepiped-shaped internal space
48 upper lid portion generally rectangular-shaped flat long front wall
49 upper lid portion front wall outer surface
50 hinging means
51 upper lid closed position 52 pair of upper lid portion snap lock latch parts
53 upper lid open position
54 lower portion parallelepiped-shaped flat holder insert
56 first plurality of holder insert throughbores
58 second plurality of holder insert throughbores
60 third plurality of holder insert throughbores
62 fourth plurality of holder insert throughbores
64 fifth plurality of holder insert throughbores
66 holder insert miscellaneous compartment throughbore
68 holder insert, height
70 holder insert clearance distance
72 upper lid portion parallelepiped-shaped flat insert

DETAILED DESCRIPTION OF THE PREFERRED EMBODIMENT

Referring now to the figures in which like numerals indicate like parts, and particularly to FIG. 1, the dry cell battery storage case of the present invention is shown generally at 10 having a "D" attery 12 being stored therein or removed therefrom, an "AA" battery 14 being stored therein or removed therefrom, a "C" battery 16 being stored therein or removed therefrom, a "9V" battery being stored therein or removed therefrom, a "AAA" battery 20 being stored therein or removed therefrom, and miscellaneous parts 22, such as but not limited to button batteries, photo batteries, battery accessories, and battery testers, being stored therein or removed therefrom.

It is to be understood that the specific battery types mentioned, supra, are for illustrative purposes only and that any size and shape battery presently in use can be stored.

Figure 2:
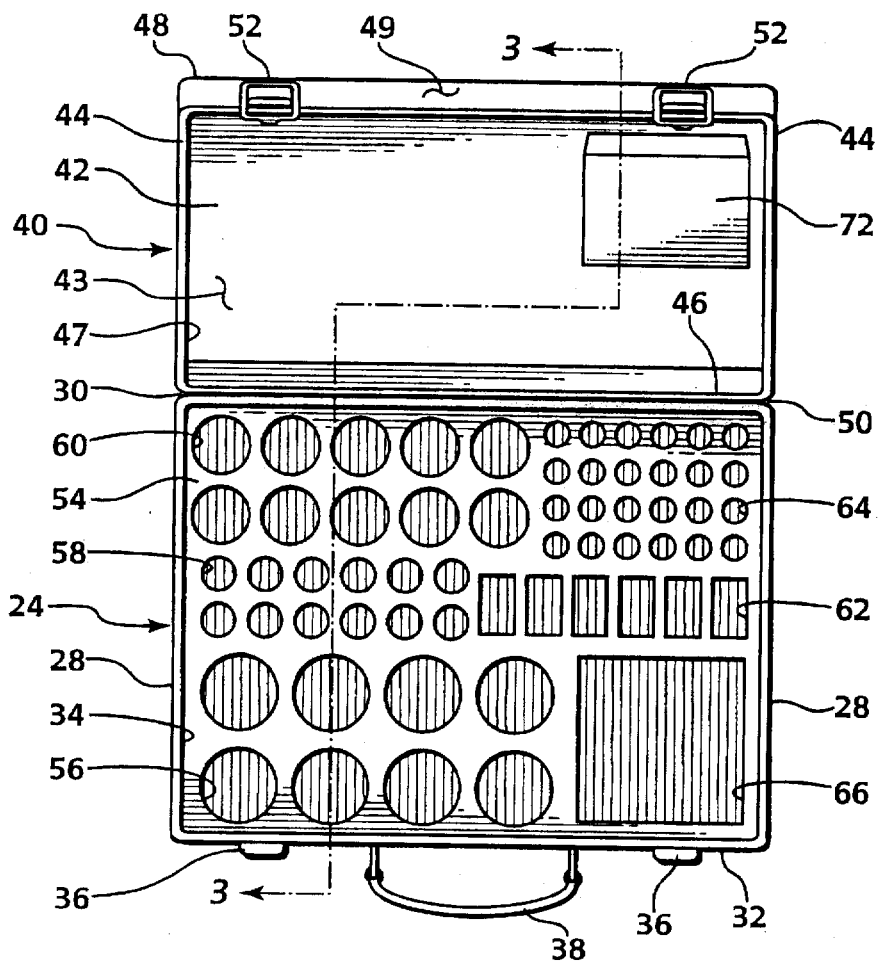
FIG. 2 is a diagrammatic top plan view taken in the general direction of arrow 2 in FIG. 1.
Figure 3:
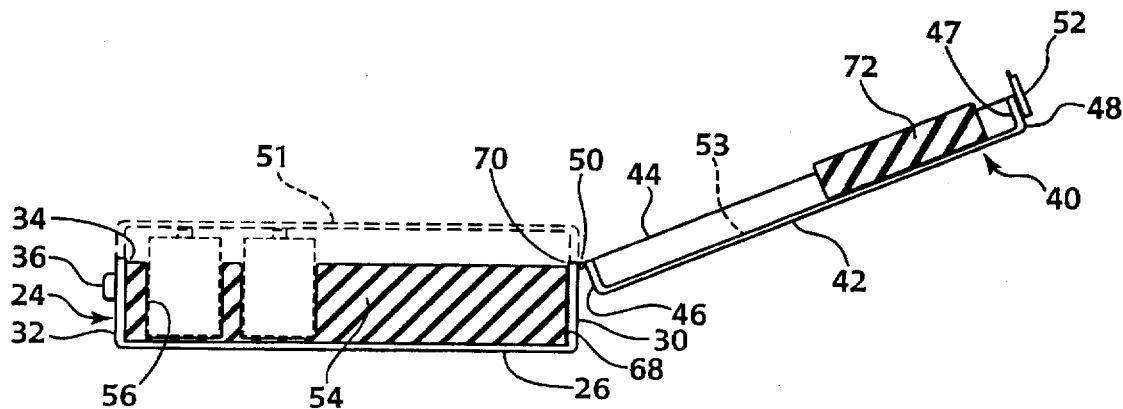
FIG. 3 is a cross sectional view taken on line 3—3 in FIG. 2.

The configuration of the dry cell battery storage case 10 can best be seen in FIGS. 1 through 3, and as such will be discussed with reference thereto.

The dry cell battery storage case 10 includes a hollow, open top, parallelepiped-shaped lower portion 24 that has a lower portion generally rectangular-shaped flat bottom 26, a pair of lower portion generally rectangular-shaped flat short side walls 28 that extend vertically upwardly from the short sides of the lower portion generally rectangular-shaped flat bottom 26 of the hollow, open top, parallelepiped-shaped lower portion 24, a lower portion generally rectangular-shaped flat long back wall 30 that extends vertically upwardly from the long back side of the lower portion generally rectangular-shaped flat bottom 26 of the hollow, open top, parallelepiped-shaped lower portion 24, a lower portion generally rectangular-shaped flat long front wall 32 that extends vertically upwardly from the long front side of the lower portion generally rectangular-shaped flat bottom 26 of the hollow, open top, parallelepiped-shaped lower portion 24 and has a lower portion front wall outer surface 33.

The hollow, open top, parallelepiped-shaped lower portion 24 is 10" long, 7½" wide, and 1¼" high and my be made of any suitable material, Such as but not limited to, plastic, or that of conventional luggage, attache cases or the like.

The pair of lower portion generally rectangular-shaped flat short side walls 28 of the hollow, open top, parallelepiped-shaped lower portion 24, the lower portion generally rectangular-shaped flat long back wall 30 of the hollow, open top, parallelepiped-shaped lower portion 24, and the lower portion generally rectangular-shaped flat long front wall 32 of the hollow, open top, parallelepiped-shaped lower portion 24 form a continuous perimeter that together with the lower portion generally rectangular-shaped flat bottom 26 of the hollow, open top, parallelepiped-shaped lower portion 24 define a lower portion parallelepiped-shaped internal space 34.

Each of a pair of lower portion snap lock catch parts 36 are disposed on the lower portion front wall outer surface 33 of lower portion generally rectangular-shaped flat long front wall hollow, open top, parallelepiped-shaped lower portion 24, in proximity to each short end thereof.

A carrying handle 38 is disposed of the lower portion front wall outer surface 33 of the lower portion generally rectangular-shaped flat long front wall 32 of the hollow, open top, parallelepiped-shaped lower portion 24, intermediate the pair of lower portion snap lock catch parts 36, so that the dry cell battery storage case 10 can be conveniently transported.

The dry cell battery storage case 10 further includes a hollow, open bottom, parallelepiped-shaped upper lid portion 40 that has an upper lid portion generally rectangular-shaped flat top 42 with an upper lid portion top inner surface 43, a pair of upper lid portion generally rectangular-shaped flat short side walls 44 that extend vertically downwardly from the pair of shorts sides of the upper lid portion generally rectangular-shaped flat top 42 of the hollow, open bottom, parallelepiped-shaped upper lid portion 40, an upper lid portion generally rectangular-shaped flat long back wall 46 that extends vertically downwardly from the long back side of the upper lid portion generally rectangular-shaped flat top 42 of the hollow, open bottom, parallelepiped-shaped upper lid portion 40, an upper lid portion generally rectangular-shaped flat long front wall 48 that extends vertically downwardly from the long front side of the upper lid portion generally rectangular-shaped flat top 42 of the hollow, open bottom, parallelepiped-shaped upper lid portion 40 and has an upper lid portion front wall outer surface 49.

The hollow, open bottom, parallelepiped-shaped upper lid portion 40 is 10" long, 7½" wide, and 1¼ high and my be made of any suitable material, such as but not limited to, plastic, the same as that of the hollow, open top, parallelepiped-shaped lower portion 24, or that of conventional luggage, attache cases or the like.

The pair of upper lid portion generally rectangular-shaped flat shorn side walls 44 of the upper of the hollow, open bottom, parallelepiped-shaped upper lid portion 40, the upper lid portion generally rectangular-shaped flat long back wall 46 of the hollow, open bottom, parallelepiped-shaped upper lid portion and the upper lid portion generally rectangular-shaped flat long front wall 48 of the hollow, open bottom, parallelepiped-shaped upper lid portion 40 form a continuous perimeter that together with the upper lid portion generally rectangular-shaped flat top 42 of the hollow, open bottom, parallelepiped-shaped upper lid portion 40 define an upper lid portion parallelepiped-shaped internal space 47.

The upper lid portion generally rectangular-shaped flat long back wall 46 of the hollow, open bottom, parallelepiped-shaped upper lid portion 40 is hingingly mounted to the lower portion generally rectangular-shaped flat long back wall 30 of the hollow, open top, parallelepiped-shaped lower portion 24, by hinging means 50.

The hinging means 50 may be, such as but not limited to, a piano hinge or a pair of spaced-apart hinges or the like, so that the hollow, open bottom, parallelepiped-shaped upper lid portion 40 can assume an upper lid closed position 51 and an upper lid open position 53 relative to the hollow, open top, parallelepiped-shaped lower portion 24.

Each of a pair of upper lid portion snap lock latch parts 52 are disposed on the upper lid portion front wall outer surface 49 of the upper portion generally rectangular-shaped flat long front wall 48 of the hollow, open bottom, parallelepiped-shaped upper lid portion 40, in proximity to each short end thereof.

The pair of upper lid portion snap lock latch parts 52 of the hollow, open bottom, parallelepiped-shaped upper lid portion 40 locking engage the pair of lower portion snap lock catch parts 36 of the hollow, open top, parallelepiped-shaped lower portion 24 and maintain the hollow, open bottom, parallelepiped-shaped upper lid portion 40 in the upper lid closed position 51.

The dry cell battery storage case 10 further includes a lower portion parallelepiped-shaped flat holder insert 54 that has a first plurality of holder insert throughbores 56, a second plurality of holder insert throughbores 58, a third plurality of holder insert throughbores 60, a fourth plurality of holder insert throughbores 62, a fifth plurality of holder insert throughbores 64, and a holder insert miscellaneous compartment throughbore 66.

The lower portion parallelepiped-shaped flat holder insert 54 of the hollow, open top, parallelepiped-shaped lower portion 24 may be, such as but not limited to, plastic, wood, foam or the like and is sized to substantially fill the lower portion parallelepiped-shaped internal space 34 of the hollow, open top, parallelepiped-shaped lower portion 24, to a insert holder insert height 68 that is a holder insert clearance distance 70 below the open top of the hollow, open top, parallelepiped-shaped lower portion 24.

The first plurality of holder insert throughbores 56 of the lower portion parallelepiped-shaped flat holder insert 54 of the hollow, open top, parallelepiped-shaped lower portion 24 is eight circular apertures, each of which having a diameter of 1¼", so that each "D" battery 12 can be stored therein or removed therefrom.

The second plurality of holder insert throughbores 58 of the lower portion parallelepiped-shaped flat holder insert 54 of the hollow, open top, parallelepiped-shaped lower portion 24 is twelve circular apertures, each of which having a diameter of 9/16", so that each "AA" battery 14 can be stored therein or removed therefrom.

The third plurality of holder insert throughbores 60 of the lower portion parallelepiped-shaped flat holder insert 54 of the hollow, open top, parallelepiped-shaped lower portion 24 is ten circular apertures, each of which having a diameter of 1", so that each "C" battery 16 can be stored therein or removed therefrom.

She fourth plurality of holder insert throughbores 62 of the lower portion parallelepiped-shaped flat holder insert 54 of the hollow, open top, parallelepiped-shaped lower portion 24 is six generally rectangular-shaped apertures, each of which having a width of 5/8" and a length of 1", so that each "9V" battery 18 can be stored therein or removed.

The fifth plurality of holder insert throughbores 64 of the lower portion parallelepiped-shaped flat holder insert 54 of the hollow, open top, parallelepiped-shaped lower portion 24 is twenty-four circular apertures, each of which having a diameter of 7/16", so that each "AAA" battery 20 can be stored therein or removed therefrom.

The holder insert miscellaneous compartment throughbore 66 of the lower portion parallelepiped-shaped flat holder insert 54 of the hollow, open top, parallelepiped-shaped lower portion 24 is an open generally rectangular-shaped aperture having a width of 2¾", and a length of 3", so that the miscellaneous parts 22 can be stored wherein or removed therefrom.

The dry cell battery storage case 10 further includes an upper lid portion parallelepiped-shaped flat insert 72 that may be, such as but not limited to, plastic, wood, foam or the like, or similar to that of the lower portion parallelepiped-shaped flat holder insert 54.

The upper lid portion parallelepiped-shaped flat insert 72 is disposed on the upper lid top inner surface 43 of the upper lid portion generally rectangular-shaped flat top 42 of the hollow, open bottom, parallelepiped-shaped upper lid portion 40 in a position directly above the holder insert miscellaneous compartment throughbore 66 of the lower portion parallelepiped-shaped flat holder insert 54 of the hollow, open top, parallelepiped-shaped lower portion 24.

The upper lid portion parallelepiped-shaped flat insert 72 is 2¾" wide and 3" long and has a depth sufficient to slightly enter and close the holder insert miscellaneous compartment throughbore 66 of the lower portion parallelepiped-shaped flat holder insert 54 of the hollow, open top, parallelepiped-shaped lower portion 24 when the hollow, open bottom, parallelepiped-shaped upper lid portion 40 assumes the upper lid closed position 51, so that the miscellaneous parts 22 are maintained in the holder insert miscellaneous compartment throughbore 66 of the lower portion parallelepiped-shaped flat holder insert 54 of the hollow, open top, parallelepiped-Shaped lower portion 24.

Each of the pair of upper lid portion generally rectangular-shaped flat short side walls 44 of the hollow, open bottom, parallelepiped-shaped upper lid portion 40 has an upper lid portion short side laterally-oriented vent 45 disposed therethrough, so that when the hollow, open bottom, parallelepiped-shaped upper lid portion 40 is An the upper lid portion closed position 51 any gases developed from each "D" battery 12, each "AA" battery 14, each "C" battery, each "9V" battery 18, and each "AAA" battery 20 stored therein can be properly evacuated therefrom while maintaining proper ventilation for longevity.

It will be understood that each of the elements described above, or two or more together, may also find a useful application in other types of constructions differing from the types described above.

While the invention has been illustrated and described as embodied in a dry cell battery storage case, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A dry cell battery storage case maintaining miscellaneous parts therein and allowing a plurality of different sized and shaped batteries to be easily secured therein for organized storage while properly evacuating any gases developed from the plurality of different sized and shaped batteries stored therein and maintaining proper ventilation for longevity of the plurality of different sized and shaped batteries stored therein and allowing the plurality of different sized and shaped batteries stored therein to be easily removed therefrom by providing an exposed portion of the plurality of different sized and shaped batteries stored therein for gripping, comprising:

a) a hollow, open top, parallelepiped-shaped lower portion; said hollow, open top, parallelepiped-shaped lower portion having an open top, a generally rectangular-shaped flat bottom with a long front side, a long back side, and a pair of short sides, a pair of generally rectangular-shaped flat short side walls extending vertically upwardly from said pair of short sides of said generally rectangular-shaped flat bottom of said hollow, open top, parallelepiped-shaped lower portion, a generally rectangular-shaped flat long back wall extending vertically upwardly from said long back side of said generally rectangular-shaped flat bottom of said hollow, open top, parallelepiped-shaped lower portion, and a generally rectangular-shaped flat long front wall extending vertically upwardly from said long front side of said lower portion generally rectangular-shaped flat bottom of said hollow, open top, parallelepiped-shaped lower portion and having an outer surface and a pair of short sides; said pair of generally rectangular-shaped flat short side walls of said hollow, open top, parallelepiped-shaped lower portion, said generally rectangular-shaped flat long back wall of said hollow, open top, parallelepiped-shaped lower portion, and said generally rectangular-shaped flat long front wall of said hollow, open top, parallelepiped-shaped lower portion forming a continuous perimeter that together with said generally rectangular-shaped flat bottom of said hollow, open top, parallelepiped-shaped lower portion defining internal space;

b) a hollow, open bottom, parallelepiped-shaped upper lid portion being pivotally mounted to said hollow, open top, parallelepiped-shaped lower portion and movable through a closed position and an open position relative to said hollow, open top, parallelepiped-shaped lower portion; said hollow, open bottom, parallelepiped-shaped upper lid portion having a generally rectangular-shaped flat top with an inner surface, a long front side, a long back side, and a pair of short sides, a pair of generally rectangular-shaped flat short side walls extending vertically downwardly from said pair of short sides of said generally rectangular-shaped flat top of said hollow, open bottom, parallelepiped-shaped upper lid portion, generally rectangular-shaped flat long back wall extending vertically downwardly from said long back side of said generally rectangular-shaped flat top of said hollow, open bottom, parallelepiped-shaped upper lid portion, a generally rectangular-shaped flat long front wall extending vertically downwardly from said long front side of said generally rectangular-shaped flat top of said hollow, open bottom, parallelepiped-shaped upper lid portion and having an outer surface and a pair of short sides; said pair of generally rectangular-shaped flat short side walls of said hollow, open bottom, parallelepiped-shaped upper lid portion, said generally rectangular-shaped flat long back wall of said hollow, open bottom, parallelepiped-shaped upper lid portion, and said generally rectangular-shaped flat long front wall of said hollow, open bottom, parallelepiped-shaped upper lid portion forming a continuous perimeter that together with said generally rectangular-shaped flat top of said hollow, open bottom, parallelepiped-shaped upper lid portion defining a parallelepiped-shaped internal space; each of said pair of generally rectangular-shaped flat short side walls of said hollow, open bottom, parallelepiped-shaped upper lid portion has an elongated and slender vent through slot extending therethrough and longitudinally therealong, so that when said hollow, open bottom, parallelepiped-shaped upper lid portion assumes said closed position the any gases developed from the plurality of different sized and shaped batteries stored therein is properly evacuated therefrom while maintaining proper ventilation for longevity of the plurality of different sized and shaped batteries stored therein;

c) pivoting means for pivotally mounting said hollow, open bottom, parallelepiped-shaped upper lid portion to said hollow, open top, parallelepiped-shaped lower portion; said pivoting means including one of a piano hinge and spaced-apart hinges, so that said hollow, open bottom, parallelepiped-shaped upper lid portion can assume said closed position and said open position relative to said hollow, open top, parallelepiped-shaped lower portion; said pivoting means being disposed on said generally rectangular-shaped flat long back wall of said hollow, open top, parallelepiped-shaped lower portion and on said generally rectangular-shaped flat long back wall of said hollow, open bottom, parallelepiped-shaped upper lid portion, so that a moment arm created by said hollow, open bottom, parallelepiped-shaped upper lid portion when said hollow, open bottom, parallelepiped-shaped upper lid portion assumes said open position is reduced;

d) a pair of snap lock catch parts; each of said pair of snap lock catch parts being disposed on said outer surface of said generally rectangular-shaped flat long front wall of said hollow, open top, parallelepiped-shaped lower portion in proximity to each of said pair of short sides of said generally rectangular-shaped flat long front wall of said hollow, open top, parallelepiped-shaped lower portion;

e) a pair of snap lock latch parts; each of said pair of snap lock latch parts being disposed on said outer surface of said generally rectangular-shaped flat long front wall of said hollow, open bottom, parallelepiped-shaped upper lid portion in proximity to each of said pair of short sides of said generally rectangular-shaped flat long front wall of said hollow, open bottom, parallelepiped-shaped upper lid portion; said pair of snap lock latch parts locking engaging said pair of snap lock catch parts, so that said hollow, open bottom, parallelepiped-shaped upper lid portion is maintained in said closed position;

f) a foam and parallelepiped-shaped holder insert being disposed in said hollow, open top, parallelepiped-shaped lower portion and having a plurality of through-bores for removably receiving the plurality of different sized and shaped batteries; said plurality of through-bores in said foam and parallelepiped-shaped holder insert in said hollow, open top, parallelepiped-shaped lower portion expanding when the plurality of different sized and shaped batteries are received therein as a result of the inherent resiliency of foam and causing said foam and parallelepiped-shaped holder insert in said hollow, open top, parallelepiped-shaped lower portion to compress against the plurality of different sized and shaped batteries which abut against said inner surface of said generally rectangular-shaped flat top of said hollow, open bottom, parallelepiped-shaped upper lid portion when said hollow, open bottom, parallelepiped-shaped upper lid portion assumes said closed position, so that the plurality of different sized and shaped batteries are easily secured therein for organized storage in said dry cell battery storage case; said foam and parallelepiped-shaped holder insert in said hollow, open top, parallelepiped-shaped lower portion being sized to fill said internal space of said hollow, open top, parallelepiped-shaped lower portion to a height slightly below said open top of said hollow, open top, parallelepiped-shaped lower portion, so that when the plurality of different sized and shaped batteries are easily secured therein a portion of each of the plurality of different sized and shaped batteries extends above said foam, parallelepiped-shaped flat holder insert in said hollow, open top, parallelepiped-shaped lower portion providing the exposed portion of the plurality of different sized and shaped batteries for gripping and easy removal thereof; said plurality of throughbores in said foam and parallelepiped-shaped holder insert in said hollow, open top, parallelepiped-shaped lower portion having at least one first sized and shaped throughbore, at least one second sized and shaped throughbore, at least one third sized and shaped throughbore, at least one fourth sized and shaped throughbore, at least one fifth sized and shaped throughbores, and a compartment sized and shaped throughbore having a width and a length; and g) a foam and parallelepiped-shaped insert disposed on said inner surface of said generally rectangular-shaped flat top of said hollow, open bottom, parallelepiped-shaped upper lid portion and being confined to directly above said compartment sized and shaped throughbore in said foam and parallelepiped-shaped holder insert in said hollow, open top, parallelepiped-shaped lower portion and having a width and length equivalent to said width and length of said compartment sized and shaped throughbore in said foam and parallelepiped-shaped holder insert in said hollow, open top, parallelepiped-shaped lower portion and a height sufficient to slightly enter and close said compartment sized and shaped throughbore in said foam and parallelepiped-shaped holder insert in said hollow, open top, parallelepiped-shaped lower portion when said hollow, open bottom, parallelepiped-shaped upper lid portion assumes said closed position, so that the miscellaneous parts are maintained in said dry cell battery storage case.

2. The case as defined in claim 1, wherein said hollow, open top, parallelepiped-shaped lower portion is plastic.

3. The case as defined in claim 1, wherein said dry cell battery storage case is 10" long, 7½" wide, and 2½" high, so that an ample supply of the plurality of different sized and shaped batteries can be stored and organized therein.

4. The case as defined in claim 1, wherein said hollow, open bottom, parallelepiped-shaped upper lid portion is plastic.

5. The case as defined in claim 1, wherein said hollow, open bottom, parallelepiped-shaped upper lid portion is 10" long, 7½" wide, and 1¼" high, so that an ample supply of the plurality of different sized and shaped batteries can be stored and organized therein.

6. The case as defined in claim 1, wherein each of said at least one first sized and shaped throughbore of said foam and parallelepiped-shaped holder insert of said hollow, open top, parallelepiped-shaped lower portion is circular with a diameter of 1¼", so that a "D" battery can be stored therein and removed therefrom.

7. The case as defined in claim 1, wherein each of said at least one second sized and shaped throughbore of said foam and parallelepiped-shaped flat holder insert of said hollow, open top, parallelepiped-shaped lower portion is circular with a diameter of 9/16", so that a "AA" battery can be stored therein and removed therefrom.

8. The case as defined in claim 1, wherein each of said at least one third sized and shaped throughbore of said foam and parallelepiped-shaped holder insert of said hollow, open top, parallelepiped-shaped lower portion is circular with a diameter of 1", so that a "C" battery can be stored therein and removed therefrom.

9. The case as defined in claim 1, wherein each of said at least one fourth sized and shaped throughbore of said foam and parallelepiped-shaped holder insert of said hollow, open top, parallelepiped-shaped lower portion is rectangular with a width of ⅝ and a length of 1", so that a "9V" battery can be stored therein and removed therefrom.

10. The case as defined in claim 1, wherein each of said at least one fifth sized and shaped throughbore of said foam and parallelepiped-shaped holder insert of said hollow, open top, parallelepiped-shaped lower portion is circular with a diameter of 7/16", so that a "AAA" battery can be stored therein and removed therefrom.

11. The case as defined in claim 1, wherein said compartment sized and shaped throughbore of said foam and parallelepiped-shaped holder insert of said hollow, open top, parallelepiped-shaped lower portion is generally rectangular with a width of 2¾" and a length of 3", so that miscellaneous parts can be stored therein and removed therefrom.

12. The case as defined in claim 1; further comprising a carrying handle disposed on said outer surface of said generally rectangular-shaped flat long front wall of said hollow, open top, parallelepiped-shaped lower portion intermediate said pair of snap lock catch parts of said hollow, open top, parallelepiped-shaped lower portion, so that said dry cell battery storage case can be conveniently transported.

* * * * *